Patented Sept. 9, 1941

2,255,385

UNITED STATES PATENT OFFICE 2,255,385

DYESTUFFS OF THE PARA-ROSANILINE SERIES

Heinrich Hopff and Adolf Diebold, Ludwigshafen-on-the-Rhine, Germany, assignors to General Aniline & Film Corporation, a corporation of Delaware No Drawing. Application March 30, 1938, Serial No. 198,900. In Germany April 10, 1937

4 Claims. (Cl. 260—391)

The present invention relates to new basic dyestuffs and their sulphonic acid derivatives.

We have found that valuable new basic dyestuffs are obtained by causing basic dyestuffs containing at least one amino group bearing a free hydrogen atom or their sulphonic acid derivatives to react with vinyl ketones, more particularly with vinyl methyl ketone. The amino groups are thus converted into N-gamma-oxobutylamino groups.

Suitable basic dyestuffs are for example all triphenyl-methane dyestuffs containing amino groups, as well as the corresponding safranines, indulines, oxazines, thiazines, diazines, rhodamines and aminoazo compounds, and the sulphonic acids derived from these dyestuffs.

For the preparation of the new dyestuffs, the initial material may be simply heated with an excess of the vinyl ketone. Generally speaking, the vinyl ketone should be used in an amount from about 1.3 to 1.8 molecular proportions for 1 molecular proportion of the dyestuff in order to introduce 1 gamma-oxobutyl radicle. In order to introduce 2 gamma-oxobutyl radicles, from about 2.6 to 3.6 molecular proportions should be used for 2 molecular proportions of the dyestuff. If more than 2 gamma-oxobutyl radicles be introduced a corresponding excess of vinyl ketone should be used. The progress of the reaction may generally speaking be seen by a strong deepening in color of the reaction mixture. In most cases, it is preferable to carry out the reaction in the presence of a solvent, for example, of water or organic solvents, if desired while adding substances which prevent conversion (as for example polymerization) of the vinyl ketone, as for example hydroquinone or copper compounds. In particular when the initial material containing amino groups reacts slowly, the reaction may be allowed to proceed in a closed vessel. Acid or alkaline agents, such as mineral acids, chloracetic acid, caustic alkalies or piperidine also act to promote the reaction. Especially when using mineral acids, for example small amounts of sulphuric acid, it is possible to reduce the excess of the vinyl ketone employed. Generally speaking, the reaction proceeds the more rapidly and completely the stronger the basicity of the initial material.

The adding of the vinyl ketone on the dyestuff may be performed under superatmospheric pressure by allowing the reaction to proceed in a closed vessel whereby the reaction time may be shortened. Instead of vinyl ketones, the beta-halogen ethyl ketones obtainable therefrom by the adding on of hydrogen halide may also be used. In this case it is advantageous to work in the presence of substances capable of binding acids.

The basic dyestuffs used as starting materials may contain at least one primary or secondary, or as well primary and secondary amino groups. In addition thereto they may contain one or more tertiary amino groups which do not react with vinyl ketones. When starting from dyestuffs containing primary amino groups, the adding on of the vinyl ketone may be carried out in the presence of other substances capable of reacting with amino groups, for example alkylene oxides, epichlorhydrine, butylene-chlorhydrine and the like.

Depending on the nature of the dyestuff and on the amount of vinyl ketone used, one or more hydrogen atoms may be replaced by gamma-oxo-butyl radicles. Thus in dyestuffs containing a plurality of amino groups, as for example fuchsine, there may be introduced one, two or three gamma-oxobutyl radicles, or there may be obtained mixtures of mono-, di- and tri-gamma-oxobutyl compounds. The same may be performed when starting from sulphonic acids, as for example Fuchsin S (Schultz, Farbstofftabellen, 7th edition, No. 800). Generally speaking, in primary amino groups only one hydrogen atom is replaced by the gamma-oxobutyl radicle; in some cases, however, even two hydrogen atoms of one amino group may be replaced.

The new basic dyestuffs are generally speaking crystalline and they are obtained in excellent yields. They differ from the initial materials usually by a shade of color displaced towards the blue side of the spectrum. They may be dyed very well on wool or true silk, cotton mordanted with tannic acid, cellulose acetate or paper. The new dyestuffs containing sulphonic acid groups may also be dyed on animal fibres, for example wool, silk and leather.

The following examples will further illustrate how our invention is carried out in practice but the invention is not restricted to these examples. The parts are by weight, unless otherwise stated.

Example 1

101 parts of finely ground fuchsine are heated to 60° C. with 1000 parts of butanol; 126 parts of vinyl methyl ketone are added and the mixture is heated to boiling under reflux for 15 hours. The solution, originally red, becomes blue-violet. The solvent and the unchanged vinyl methyl ketone are then evaporated off under reduced pressure and the residual dyestuff is purified by dissolving it in water and salting out in the usual manner. It represents a gold-beetle-green meal which dissolves very readily in water giving a blue-violet coloration. From the bath thus obtained cotton mordanted with tannic acid is dyed vivid and brilliant blue-violet shades, and natural silk is dyed reddish-violet shades. Vinyl ethyl ketone yields a similar dyestuff.

The new dyestuff may also be prepared in the following manner:

90 parts of vinyl methyl ketone are added to a solution, heated to between 50 and 60° C., of 101 parts of fuchsine in 400 parts of water. Without further heating, the mixture is stirred until a sample dyes cotton mordanted with tannic acid pure bluish-violet shades. The water and the unchanged vinyl methyl ketone are then evaporated off under reduced pressure. The dyestuff thus obtained represents a gold-beetle-green meal; it may be converted into the zinc chloride-sodium chloride double salt in the usual manner.

If instead of fuchsine 110 parts of Neufuchsin (Schultz, Farbstofftabellen, 7th edition, No. 782) under otherwise the same conditions be used, a dyestuff is obtained which dyes cotton mordanted with tannic acid, wool, natural silk and acetate artificial silk brilliant red-violet shades. If 98 parts of para-fuchsine (ibid. No. 779) be used, a dyestuff is obtained which dyes the before-mentioned fibres brilliant blue-violet shades.

The new basic dyestuff derived from fuchsine may also be prepared in the absence of a solvent according to the following method.

337 parts of fuchsine are mixed with 300 parts of vinyl methyl ketone. The mixture is then heated to 60° C. until a homogenous charge is obtained. This is then heated for about further one hour to from 70 to 80° C. After having allowed to cool, the reaction mixture is pulverized and a metallic green glittering meal is obtained which dyes from an aqueous bath cotton mordanted with tannic acid, natural silk and wool in brilliant blue-violet shades.

Fuchsine may also be reacted with vinyl methyl ketone in other proportions. A solution of 337 parts of fuchsine in 3000 parts of water is allowed to flow slowly into 140 parts of vinyl methyl ketone. The mixture is then heated to 60–70° C. for 3 hours. The water is then evaporated off and 450 parts of a green glittering meal are obtained which dyes from an aqueous bath wool, natural silk, leather, acetate artificial silk and paper in reddish-violet shades.

A dyestuff dyeing brilliant violet shades is obtained if a mixture of 337 parts of fuchsine with 210 parts of vinyl methyl ketone be heated to 80° C. for 2 and a half hours, and the unchanged vinyl methyl ketone be distilled off under reduced pressure.

Example 2

A mixture of 263 parts of Lauth's Violet (ibid. No. 1036), 300 parts of butanol, 28 parts of vinyl methyl ketone and 3 parts of piperidine is heated to boiling for 15 hours. The solution, originally red, thus becomes pure blue-green. The final product is a dark meal which dyes cotton mordanted with tannic acid gray-green shades, and dyes wool and natural silk blue-green shades.

By using 20 parts of aminoazobenzene instead of Lauth's Violet, a final product is obtained which crystallizes from alcohol in yellow-red needles which melts at from 158 to 159° C. and which dyes acetate artificial silk powerful golden-yellow shades from aqueous suspension.

Chrysoidine (ibid. No. 27), Bismarck-Brown (ibid. No. 311) may be reacted with vinyl methyl ketone in a similar manner. A dyestuff derived from benzoflavine (ibid. No. 909) dyes cotton mordanted with tannic acid, natural silk, acetate artificial silk and wool orange shades, whereas the dyestuffs derived from Bismarck-Brown and Chrysoidine yield yellowish-brown shades.

Example 3

81 parts of vinyl methyl ketone are allowed to flow slowly into a solution, heated to 70° C., of 107 parts of safranine (ibid. No. 967) in 500 parts of water. The mixture is stirred at the same temperature until a sample dyes cotton mordanted with tannic acid red-violet shades. After having evaporated off the water and the unchanged vinyl methyl ketone, the dyestuff is obtained as a dark-brown meal which dissolves readily in water, giving a red-violet coloration. From the bath thus obtained cotton mordanted with tannic acid, natural silk and acetate artificial silk are dyed brilliant red-violet shades.

Example 4

A mixture of 365 parts of Neufuchsin (ibid. No. 782) with 140 parts of vinyl methyl ketone is heated to 60° C. until a homogenous charge is obtained. This is heated to 70–80° C. for about one hour, then allowed to cool, and the dyestuff obtained is pulverized. It dyes natural silk, wool or cotton mordanted with tannic acid brilliant red-violet shades from an aqueous bath.

Example 5

700 parts of safranine (ibid. No. 967) are dissolved in 6000 parts of water. 560 parts of vinyl methyl ketone are allowed to slowly flow into this solution which is gently heated. After having added 36 parts of concentrated sulphuric acid, the mixture is heated to 60° C. for about 3 hours. The mixture is then allowed to cool and the precipitated dyestuff filtered off by suction. It dyes wool, natural silk and cotton mordanted with tannic acid brilliant violet-red shades from an aqueous bath. By evaporating off the water from the filtrate, a dyestuff is obtained which dyes wool, natural silk or cotton mordanted with tannic acid red-violet shades.

Example 6

427 parts of phenosafranine (ibid. No. 958) are dissolved in 3000 parts of water; 280 parts of vinyl methyl ketone are allowed to flow slowly into the solution which is gently warmed. After having added 36 parts of concentrated sulphuric acid, the whole is heated to 80 C. for about 3–4 hours. By filtering off by suction the precipitate formed a dyestuff is obtained in a yield of 610 parts which dyes cotton mordanted with tannic acid, natural silk and acetate artificial silk brilliant violettish-red shades.

By evaporating off the water from the filtrate, 160 parts of another dyestuff are obtained which dyes the before-mentioned textile materials pure brown shades.

Example 7

200 parts of a rhodamine of the formula

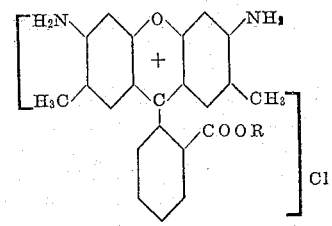

wherein R stands for $CH_3$, $C_2H_5$ or $C_3H_7$, are dissolved in 2000 parts of water, and admixed with 15 parts of 96 per cent sulphuric acid, 110 parts of vinyl methyl ketone are allowed to flow slowly into the solution which is then heated to 60–70° C.

C. for 4 hours. After having allowed to cool, the crystals precipitated are filtered off by suction and a red dyestuff is thus obtained in a yield of 260 parts which dyes animal fibres and cotton mordanted with tannic acid brilliant red shades. The dyeings obtained on cellulose ester fibres show an orange fluorescence.

*Example 8*

610 parts of para-rosaniline (ibid. No. 779) are stirred with 560 parts of vinyl methyl ketone and then heated to 80° C. for 5 hours. After having allowed to cool, a solid red-brown lustering mass is obtained in a yield of 1180 parts. It may be dissolved in water under the addition of mineral acid, yielding deep blue colorations. Cotton mordanted with tannic acid and animal fibres are dyed brilliant reddish-blue shades from this aqueous bath.

*Example 9*

200 parts of Rhodamine 3G (ibid. No. 868) are dissolved in 2000 parts of water, admixed with 110 parts of vinyl methyl ketone at from 40–60° C. and then heated to 60–70° C. for about 4 hours. After having evaporated off the water, a dyestuff is obtained in a yield of 240 parts which dyes cotton mordanted with tannic acid and natural silk brilliant red-violet shades.

A dyestuff yielding bluish-red colorations is obtained by heating a solution of 437 parts of Rhodamine 3G in 500 parts of water with 140 parts of vinyl methyl ketone at 50–70° C. for about 2 hours, and then evaporating off the water.

*Example 10*

70 parts of vinyl methyl ketone are added to a solution of 190 parts of Methylene Violet 3RA extra (ibid. No. 959) in 2000 parts of water, and the whole is heated to from 60–80° C. By salting out with sodium chloride a dyestuff is obtained in a good yield forming red-brown needles. It dyes natural silk, wool and cotton mordanted with tannic acid brilliant blue-violet shades.

*Example 11*

A mixture of 348 parts of phosphine (ibid. No. 910) with 210 parts of vinyl methyl ketone are heated to from 60–80° C. for 3 hours. After having allowed to cool, the charge is pulverized and a dyestuff is obtained in a yield of 530 parts which dyes natural silk, leather and cotton mordanted with tannic acid yellow-brown shades.

*Example 12*

379 parts of Methyl Violet (ibid. No. 783) are stirred with 250 parts of vinyl methyl ketone, admixed with 10 parts of 96 per cent sulphuric acid and heated to from 50–80° C. for 2 hours. The dyestuff thus obtained is dried without further purification. It dyes cotton mordanted with tannic acid and silk pure reddish-blue shades.

*Example 13*

337 parts of fuchsine are stirred with a mixture of 210 parts of vinyl methyl ketone and 280 parts of epichlorhydrine. The whole is then heated to from 50–70° C. for 3 hours. The color of the charge, originally red, changes to violet and finally to pure blue. The dyestuff obtained is dried and then pulverized. It forms a blue meal which dyes cotton mordanted with tannic acid and natural silk pure blue shades from aqueous bath.

*Example 14*

A solution of 260 parts of Trypaflavine (ibid. No. 906) in 3000 parts of water is heated with 284 parts of vinyl methyl ketone to from 50–80° C. for 5 hours. After having evaporated off the water, 500 parts of an orange-brown meal are obtained which dyes natural silk and cotton mordanted with tannic acid yellow-brown shades.

*Example 15*

50 parts of vinyl methyl ketone are added to a solution of 20 parts of Fuchsine S (ibid. No. 800) in 150 parts of water and the whole heated at 60° C. for 10 hours. The original red color of the solution thus becomes red-violet. The water is evaporated off under reduced pressure and the dyestuff is obtained as a dark powder with a green lustre which dissolves very readily in water. The aqueous solution dyes silk brilliant red-violet shades. A similar dyestuff is obtained in the reaction with vinyl ethyl ketone.

*Example 16*

14 parts of vinyl methyl ketone are added to a solution of 29 parts of Alkali Blue R (ibid. No. 813) in 100 parts of water and the whole is heated at from 70–80° C. until a sample withdrawn dyes silk greenish blue shades from an acid bath. After evaporating off the water under reduced pressure, the dyestuff formed is obtained as a dark blue powder which dyes wool and silk powerful greenish blue shades.

A similar dyestuff is obtained by using 67 parts of Acid Cyanine B (ibid. No. 961) instead of Alkali Blue R under the same conditions. By using 48 parts of Primulin (ibid. No. 932) instead of Alkali Blue R, an orange-yellow powder is obtained which dyes cotton or silk orange-yellow shades from a neutral or acid bath.

What we claim is:

1. Pararosaniline dyestuffs containing at least one amino group in which at least one hydrogen atom, attached to an amino group, is replaced by a gamma-oxobutyl radicle.

2. Fuchsine dyestuffs at least two hydrogen atoms of which, attached to amino groups, are replaced by gamma-oxobutyl radicles.

3. Fuchsine dyestuffs two hydrogen atoms of which, attached to amino groups, are replaced by gamma-oxobutyl radicles.

4. Fuchsine dyestuffs three hydrogen atoms of which, attached to amino groups, are replaced by gamma-oxobutyl radicles.

HEINRICH HOPFF.
ADOLF DIEBOLD.